(12) United States Patent
Liu

(10) Patent No.: US 9,360,379 B2
(45) Date of Patent: Jun. 7, 2016

(54) ELECTRONIC CIGARETTE CASE AND ELECTRONIC CIGARETTE DEVICE

(75) Inventor: Qiuming Liu, Shenzhen (CN)

(73) Assignee: HUIZHOU KIMREE TECHNOLOGY CO., LTD., SHENZHEN BRANCH, Shenzhen, Guangdong Province (CN)

( * ) Notice: Subject to any disclaimer, the term of this patent is extended or adjusted under 35 U.S.C. 154(b) by 590 days.

(21) Appl. No.: 13/824,980

(22) PCT Filed: Jun. 16, 2012

(86) PCT No.: PCT/CN2012/077050
§ 371 (c)(1),
(2), (4) Date: Mar. 18, 2013

(87) PCT Pub. No.: WO2013/185358
PCT Pub. Date: Dec. 19, 2013

(65) Prior Publication Data
US 2013/0336358 A1    Dec. 19, 2013

(51) Int. Cl.
*G01K 1/02*      (2006.01)
*G01K 1/14*      (2006.01)
*G01K 13/00*     (2006.01)
*H02J 7/00*      (2006.01)

(52) U.S. Cl.
CPC .............. *G01K 13/00* (2013.01); *G01K 13/002* (2013.01); *H02J 7/0042* (2013.01); *H02J 7/0052* (2013.01); *H02J 2007/0062* (2013.01)

(58) Field of Classification Search
CPC ... A24F 47/0008; A61M 11/00; G01K 13/02; G01K 1/02; G01K 1/14
See application file for complete search history.

(56) References Cited

U.S. PATENT DOCUMENTS

| | | | |
|---|---|---|---|
| 7,597,099 B2* | 10/2009 | Jones et al. | 128/200.23 |
| 7,785,000 B2* | 8/2010 | James | G01K 15/00 374/1 |
| 8,550,069 B2* | 10/2013 | Alelov | A61M 11/005 128/202.21 |

(Continued)

FOREIGN PATENT DOCUMENTS

| | | | | |
|---|---|---|---|---|
| CN | 101130121 A | * | 2/2008 | |
| GB | 2507102 A | * | 4/2014 | A24F 47/008 |

(Continued)

OTHER PUBLICATIONS

CN101130121A—English Language Translation, Feb. 2008.*

*Primary Examiner* — Gail Kaplan Verbitsky
(74) *Attorney, Agent, or Firm* — Cheng-Ju Chiang

(57) ABSTRACT

An electronic cigarette case with a thermometer comprises a case body for accommodating at least one electronic cigarette. The case body further comprises a thermometer device disposed therein. The thermometer device comprises a thermometry unit, a display unit and a circuit processing unit. The thermometry unit detects temperatures of articles to be tested or media to be tested and transmits temperature data to the circuit processing unit for controlling the display unit to display measured temperatures. The thermometry unit comprises a temperature sensor and an electrode piece. The thermometry unit comprises a temperature sensor and an electrode piece. The temperature sensor is disposed at an outside of the case body and is electrically connected with the circuit processing unit via the electrode piece. The electronic cigarette case of the present invention is capable of detecting temperatures of human bodies, other objects or media such as surroundings.

8 Claims, 10 Drawing Sheets

(56) References Cited

U.S. PATENT DOCUMENTS

| | | | |
|---|---|---|---|
| 9,166,336 B1* | 10/2015 | Hartrim | |
| 2008/0017193 A1* | 1/2008 | Jones | A61M 15/009 128/200.23 |
| 2008/0216824 A1* | 9/2008 | Ooida | 128/200.21 |
| 2011/0226236 A1* | 9/2011 | Buchberger | A61M 11/041 128/200.23 |
| 2011/0249070 A1* | 10/2011 | Mason | B41J 2/355 347/188 |
| 2013/0104916 A1* | 5/2013 | Bellinger | A61M 11/041 131/328 |
| 2013/0255702 A1* | 10/2013 | Griffith, Jr. | A24F 47/008 131/328 |
| 2013/0319440 A1* | 12/2013 | Capuano | A24F 47/008 131/329 |
| 2014/0014126 A1* | 1/2014 | Peleg | A24F 47/008 131/329 |
| 2014/0299125 A1* | 10/2014 | Buchberger | A61M 11/041 128/202.21 |
| 2015/0196724 A1* | 7/2015 | Adamo et al. | A61M 16/0003 |
| 2016/0007653 A1* | 1/2016 | Tu | A24F 47/008 |

FOREIGN PATENT DOCUMENTS

| | | | |
|---|---|---|---|
| JP | 2008097295 A | * 4/2008 | |
| RU | WO 2011133068 A1 | * 10/2011 | A24F 15/14 |

* cited by examiner

ELECTRONIC CIGARETTE CASE AND ELECTRONIC CIGARETTE DEVICE

CROSS REFERENCE TO RELATED APPLICATIONS

The present application is a 35 U.S.C. §371 National Phase conversion of International (PCT) Patent Application No. PCT/CN2012/077050, filed on Jun. 16, 2012, the disclosure of which is incorporated by reference herein. The PCT International Patent Application was filed in Chinese.

TECHNICAL FIELD

The present invention relates to a technical area of an electronic cigarette and an electronic cigarette case and especially to an electronic cigarette device with a thermometer.

DESCRIPTION OF BACKGROUND

Currently, there is no existing electronic cigarette case capable of detecting human bodies' temperatures. The electronic cigarette case generally only accommodates at least one electronic cigarette, recharges and displays the quantity of electricity of power but cannot detect temperatures of human bodies, other objects or media.

SUMMARY

An object of the present invention is to provide an electronic cigarette case which is capable of detecting temperatures of human bodies, other objects or media.

To achieve the above objects, the present invention provides an electronic cigarette case comprising a case body for accommodating at least one electronic cigarette. The case body further comprises a thermometer device disposed therein. The thermometer device comprises a thermometry unit, a display unit and a circuit processing unit. The thermometry unit detects temperatures of articles to be tested or media to be tested and transmits temperature data to the circuit processing unit for controlling the display unit to display measured temperatures.

Furthermore, the thermometry unit comprises a temperature sensor and an electrode piece. The temperature sensor is disposed at an outside of the case body and is electrically connected with the circuit processing unit via the electrode piece. The display unit is provided within the case body, and the case body having a display window corresponding to the display unit.

Furthermore, the case body comprises a bottom case, a case cover, and a charging device which is intended to recharge the at least one electronic cigarette.

Furthermore, the thermometer device further comprises a thermometer circuit board. The circuit processing unit is integrated on the thermometer circuit board, and the display unit is configured on the thermometer circuit board.

Furthermore, the thermometer circuit board and the display unit overlap together with a partition plate inserted therebetween for heat resistance and insulation. The thermometer device is configured in the electronic cigarette case via a first frame.

Furthermore, the charging device comprises a rechargeable battery, a charging base, and a charging circuit processing unit electrically connected with the rechargeable battery and the charging base for controlling the charging battery to recharge and discharge.

Furthermore, the charging base comprises a first electrode piece and a second electrode piece respectively electrically connecting with a first electrode and a second electrode of the at least one electronic cigarette. The first electrode piece and the second electrode piece respectively connect a first electrode and a second electrode of the rechargeable battery.

Furthermore, the charging circuit processing unit is integrated on the thermometer circuit board.

Furthermore, the charging device further comprises a Universal Serial Bus (USB) interface for insertedly connecting with an external power. The USB interface electrically connects the charging circuit processing unit. The USB interface is also integrated on the thermometer circuit board.

Furthermore, a sensor hole is formed on the case body. The temperature sensor is installed in the sensor hole and a side of the temperature sensor exposed to outside of the case body. The electrode piece is s-shaped of which one end engages with a side of the temperature sensor, the other end of the electrode piece engaged with the thermometer circuit board to enable the temperature sensor electrically connect the thermometer circuit board.

Furthermore, the electronic cigarette case further comprises a switch device. The switch device comprises a key configured on the case body, and a control button correspondingly disposed on the thermometer circuit board. The control button and the thermometer circuit board are electrically connected by pressing the key so as to control the at least one electronic cigarette to recharge and/or to control the thermometer device to detect temperatures.

Furthermore, by pressing the key in different time periods the at least one electronic cigarette is capable of being triggered to recharge and the thermometer device is capable of being triggered to detect temperatures. This invention also discloses an electronic cigarette device comprising the aforesaid electronic cigarette case, the inhaling rod and the power rod of the at least one electronic cigarette accommodated in the electronic cigarette case.

Since the thermometer device is disposed in the electronic cigarette case of embodiments of the present invention, the electronic cigarette case is capable of detecting temperatures.

Embodiments of the present invention are further described in detail in cooperation with drawings as follows.

DETAILED DESCRIPTION OF THE EMBODIMENTS

As shown in FIGS. 1-14, an electronic cigarette device with a thermometer is provided in accordance with an embodiment of the present invention. The electronic cigarette device comprises an electronic cigarette case 200 and at least one electronic cigarette 100. Each of the at least one electronic cigarette comprises an inhaling rod 90 and a power rod 91.

Figure 1:
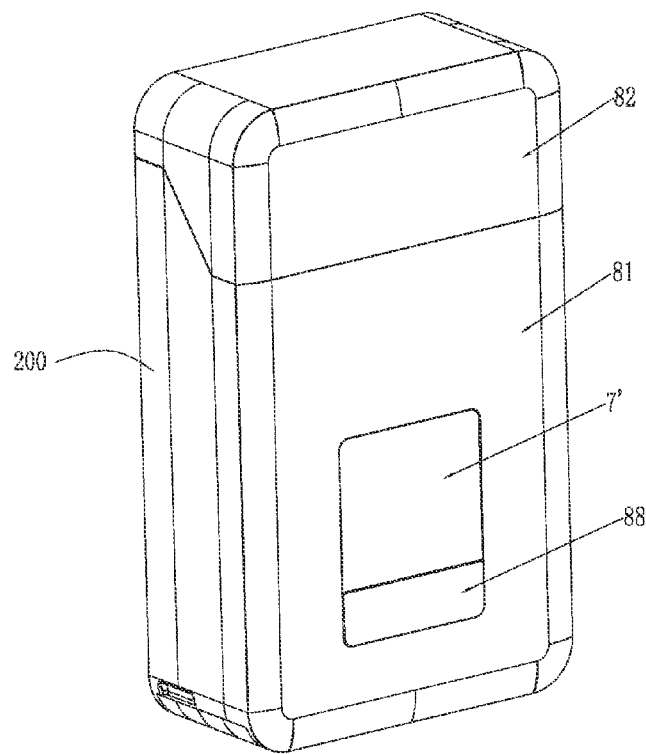
FIG. 1 is the first perspective view of an electronic cigarette case in accordance with an embodiment of the present invention.
Figure 2:
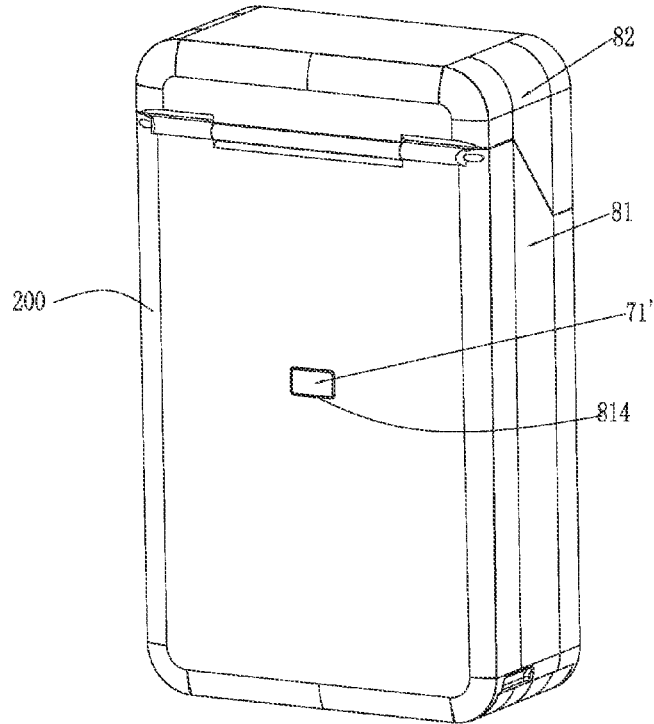
FIG. 2 is the second perspective view of the electronic cigarette case in accordance with an embodiment of the present invention.
Figure 3:
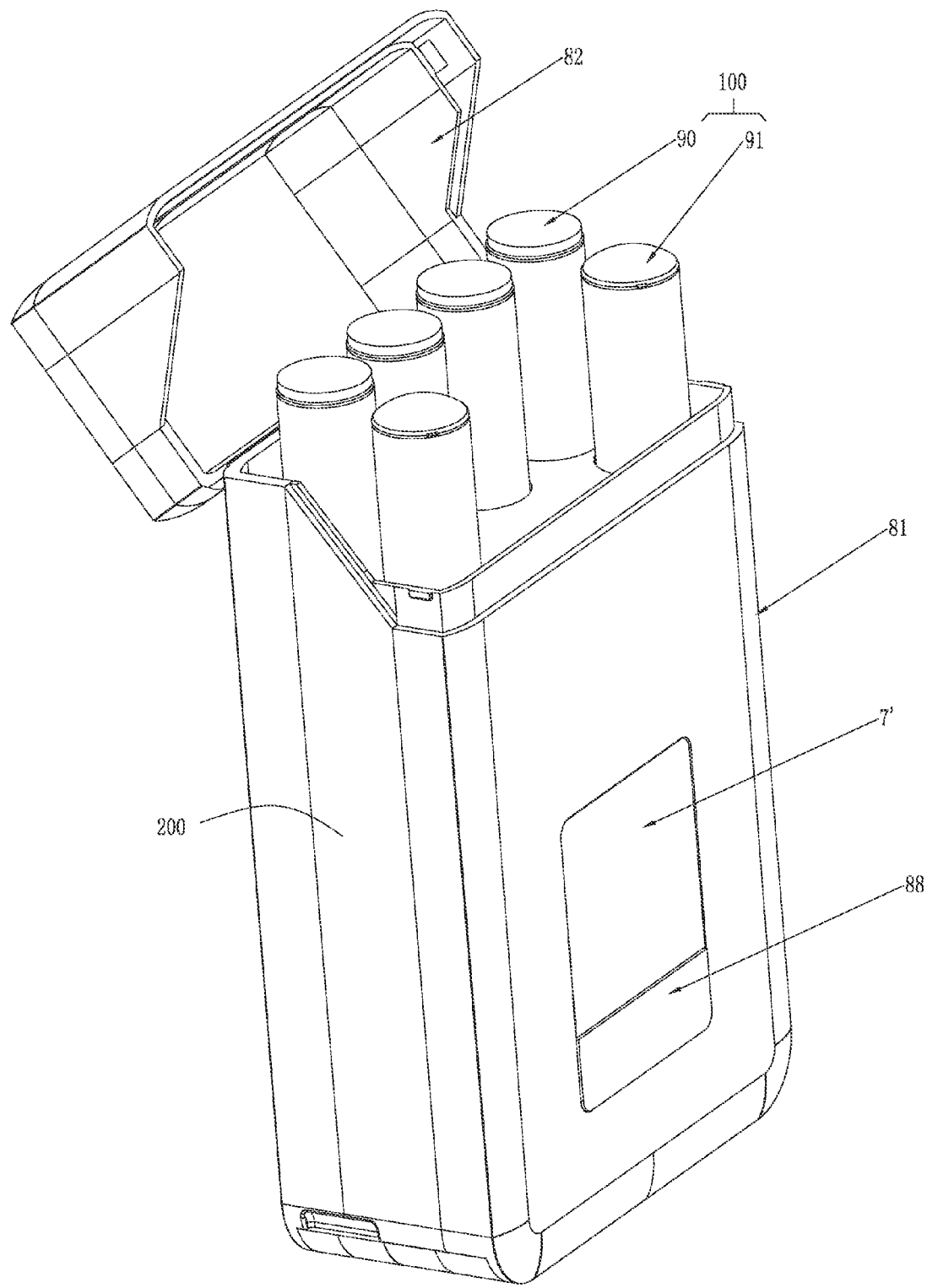
FIG. 3 is a status drawing of the electronic cigarette case without covering in accordance with an embodiment of the present invention.

As shown in FIGS. 1-9, the cigarette case 200 comprises a case body to accommodate the at least one electronic cigarette 100. The case body further comprises and disposes therein a thermometer device 7' to detect temperatures of human bodies, objects or surroundings, a charging device 87 comprising a rechargeable battery 871. The rechargeable battery 871 is used to recharge the at least one electronic cigarette 100 and to supply power for the thermometer device 7'. In this embodiment, along a depicting orientation as shown in FIG. 2, the case body comprises a bottom case 81 and a case cover 82 covering on the bottom case 81.

As shown in FIGS. 1-5, the bottom case 81 is a rectangle casing, certainly, the shape of the bottom case 81 does not limit to a rectangle, and can be shaped as, for example, a circle, an ellipse, or a polygon, etc. as long as the shape thereof matches with the case cover 82. The bottom case 81 comprises and disposes therein a first frame 85 to accommodate the rechargeable battery 871, a second frame 86 to clippingly hold and support the at least one electronic cigarette 100, the charging device 87 and a switch device 88. The bottom case 81 further comprises and disposes thereon a viewing aperture 811, a display window 812 used to cover on the viewing aperture 811, a key hole 813 (as shown in FIG. 6), a sensor installation hole 814 (as shown in FIG. 2) and a battery cover 815 located at a bottom of the bottom case 81.

The case cover 82 is pivotally connecting with and covering on the bottom case 81.

The first frame 85 is fixed in the bottom case 81 and comprises a containing trough 851 to fixedly accommodate the thermometer device 7'. The first frame 85 is made of metal or plastic material. The first frame 84 further comprises a threading trough 852.

The second frame 86 is fixed in the bottom case 81 and is located above the first frame 85 to clippingly hold and support the at least one electronic cigarette 100. The second frame 86 is made of flexible plastic material.

Figure 5:
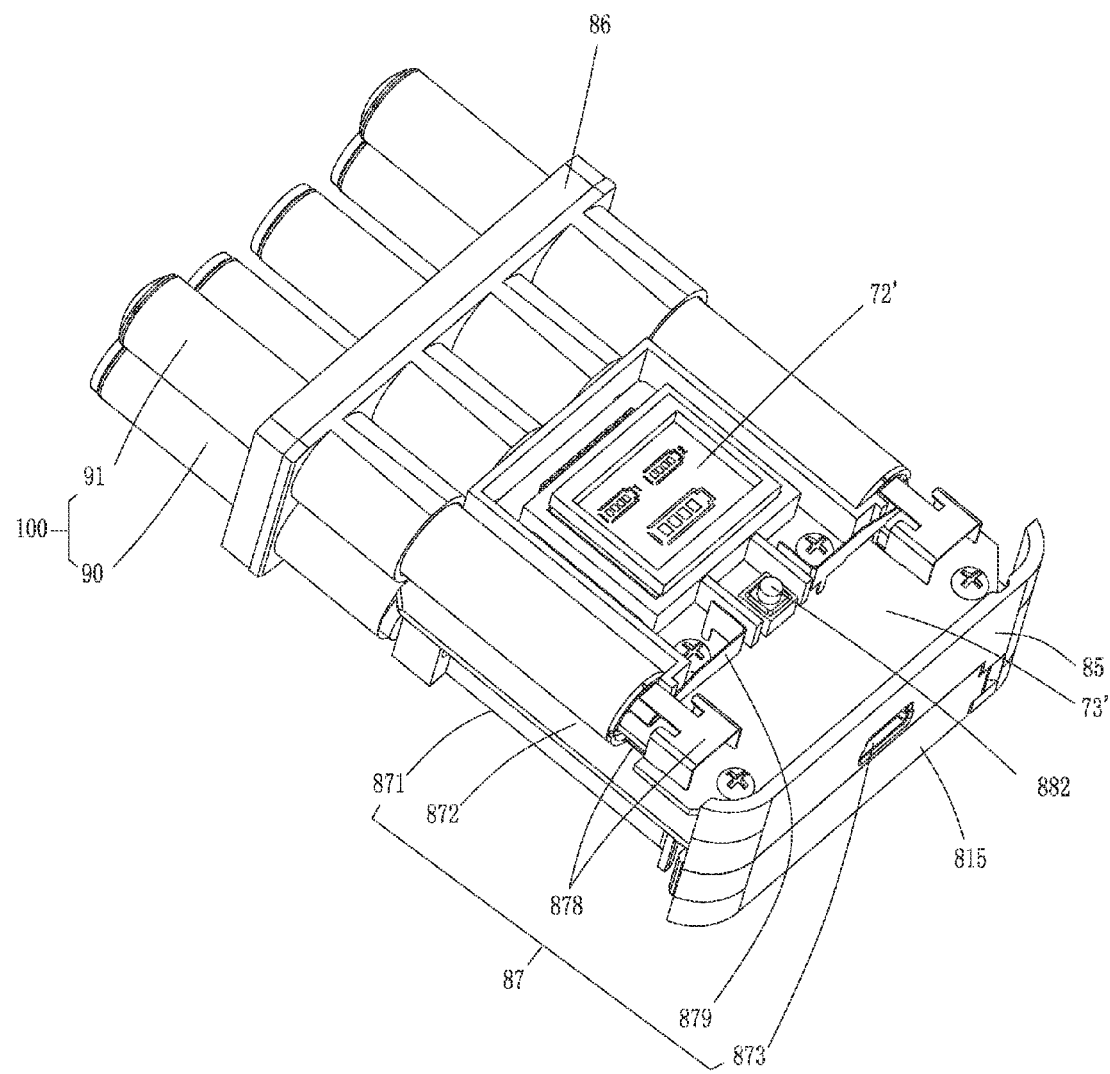
FIG. 5 is a perspective view of the electronic cigarette without casing in accordance with an embodiment of the present invention.
Figure 6:
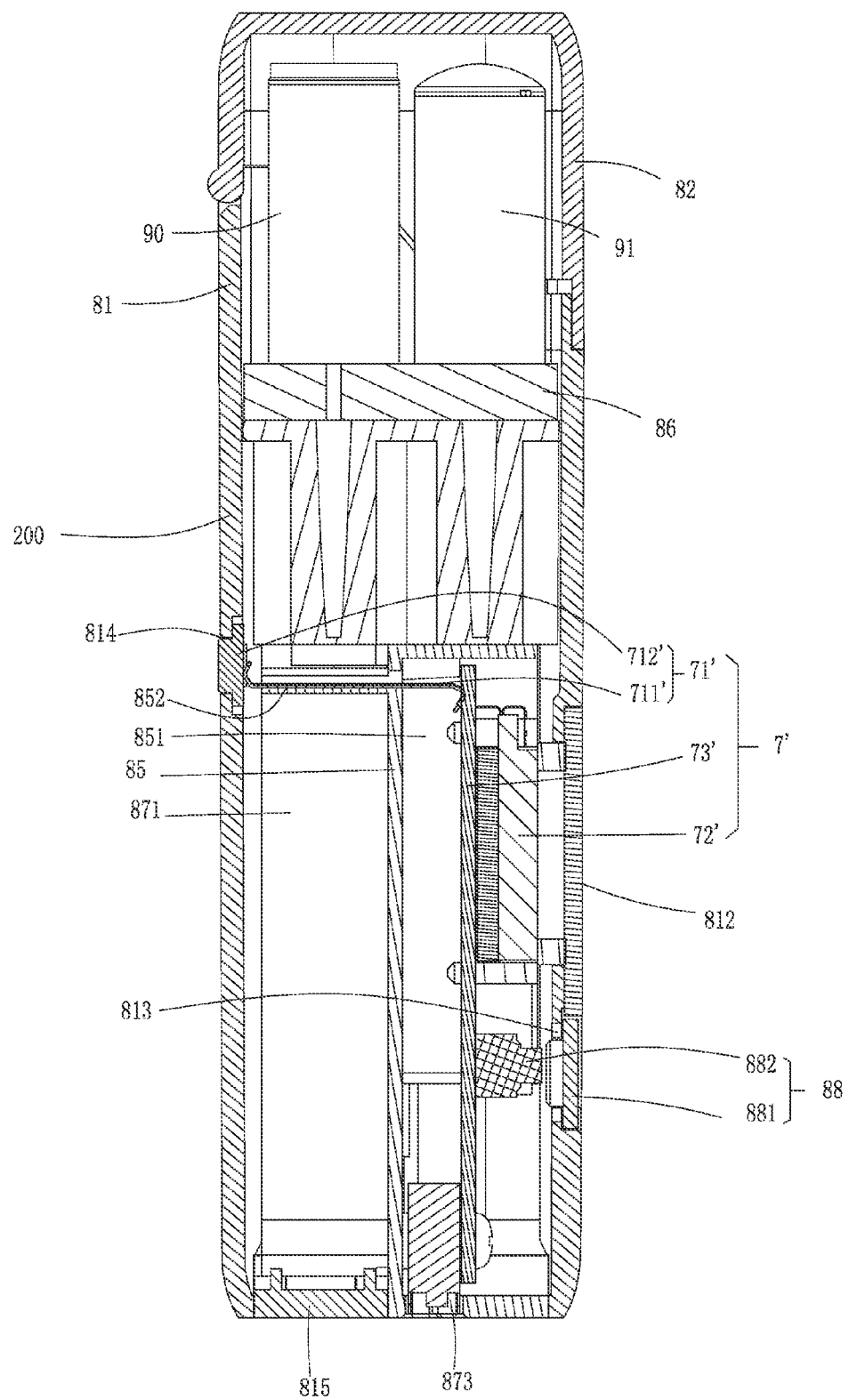
FIG. 6 is the first cross-sectional view of the electronic cigarette case in accordance with an embodiment of the present invention.
Figure 7:
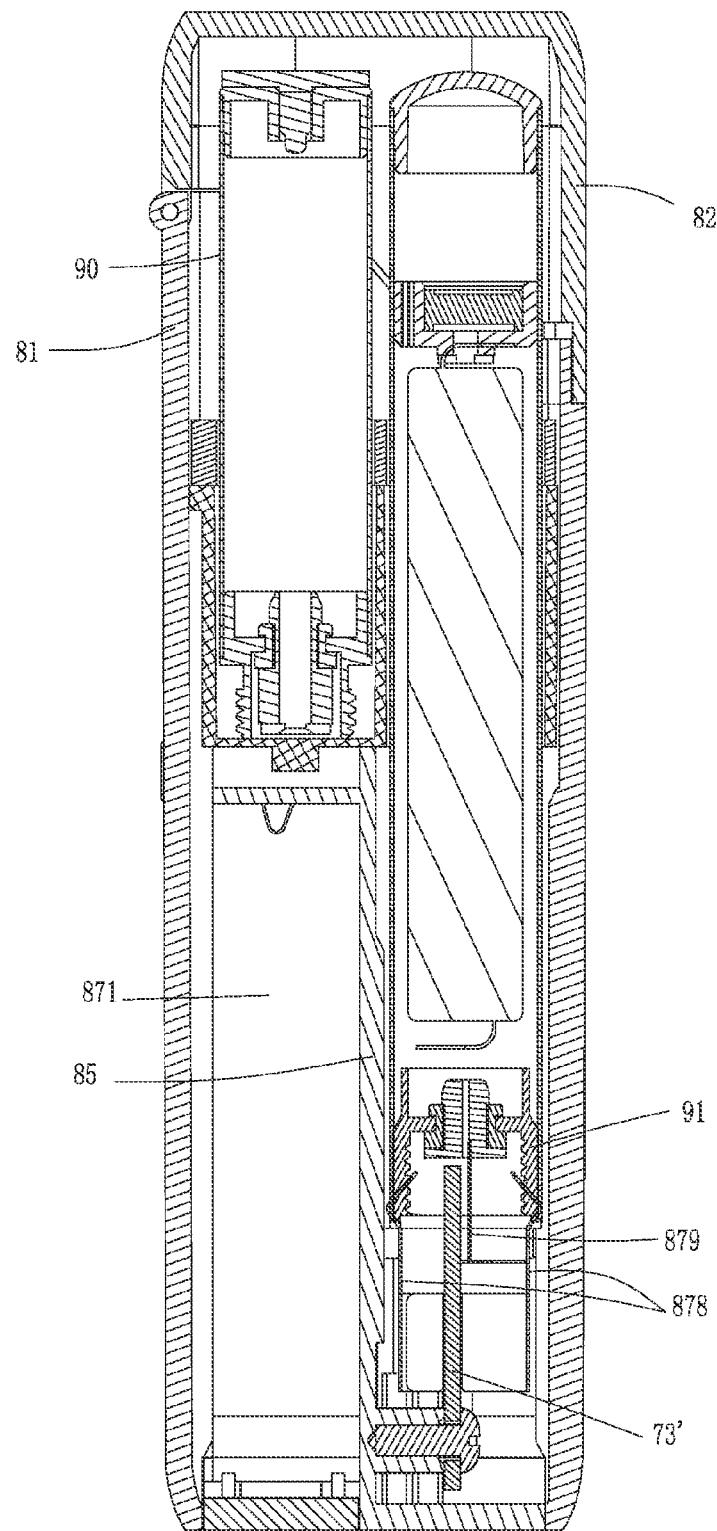
FIG. 7 is the second cross-sectional view of the electronic cigarette case in accordance with an embodiment of the present invention.
Figure 8:
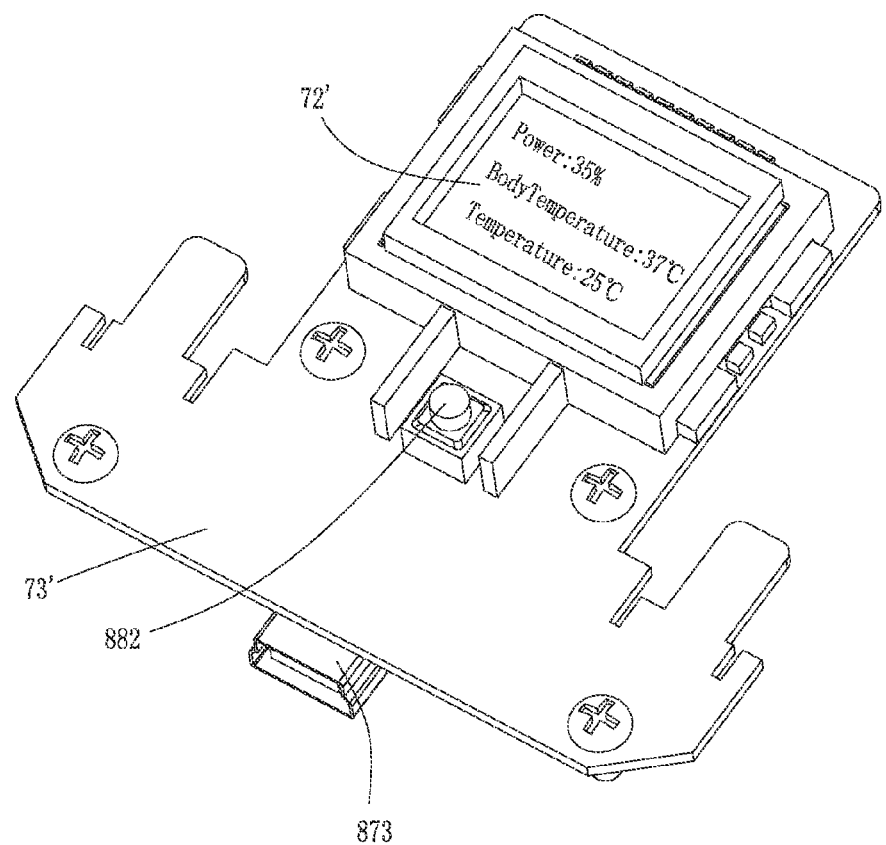
FIG. 8 is a perspective view of a thermometer circuit board of the electronic cigarette case in accordance with an embodiment of the present invention.

As shown in FIG. 5, the charging device 87 disposed in the bottom case 81 comprises the rechargeable battery 871, a charging base 872, an Universal Serial Bus (USB) interface 873 insertedly connected with an external power, and a charging circuit processing unit respectively electrically connected with the aforesaid three elements. In this embodiment, the rechargeable battery 871 is inserted in the bottom case 81 from a bottom wall of the bottom case 81 and secured by the battery cover 815. The rechargeable battery 871 is used to recharge the at least one electronic cigarette 100. The charging base 872 is clamped by the first frame 85 and the second frame 86. The charging base 872 comprises and disposes therein a first electrode piece 878 and a second electrode piece 879 respectively electrically connecting with a positive electrode and a negative electrode of the power rod 91 of each of the at least one electronic cigarette 100, and the first electrode piece 878 and the second electrode piece 879 respectively connect a positive electrode and a negative electrode of the rechargeable battery 871. In this embodiment, a threaded inner wall of the power rod 91 is used as an electrode elastically engaging with the first electrode piece 878 to conduct, and the second electrode piece 879 elastically engaging with another electrode of the threaded inner wall of the power rod 91 to conduct (as shown in FIG. 7). When the power rod 91 is inserted into the charging base 872, the rechargeable battery 871 automatically recharges the power rod 91 and the power rod 91 is automatically disconnected when the power rod 91 is fully charged. The USB interface 873 connects with the external power to recharge the rechargeable battery 871. The USB interface 873 and the charging circuit processing unit are integrated on a thermometer circuit board 73' of the thermometer device 7' to be described hereinafter.

As shown in FIG. 6, the switch device 88 comprises a key 881 attached on a sidewall of the bottom case 81 and a control bottom 882 disposed on the thermometer device 7' and correspondingly matching with the key 881. In this embodiment, the control bottom 882 is integrated on a thermometer circuit board 73' of the thermometer device 7' to be described hereinafter. In use, the electronic cigarette case is in charging mode after the key 811 is pressed in a long time and the rechargeable battery 871 recharges the at least one electronic cigarette 100 automatically. The electronic cigarette case is in measurement mode after the key 881 is pressed rapidly and the thermometer device 7' starts to detect temperatures. Certainly, control modes of the key 881 can be defined differently.

Figure 4:
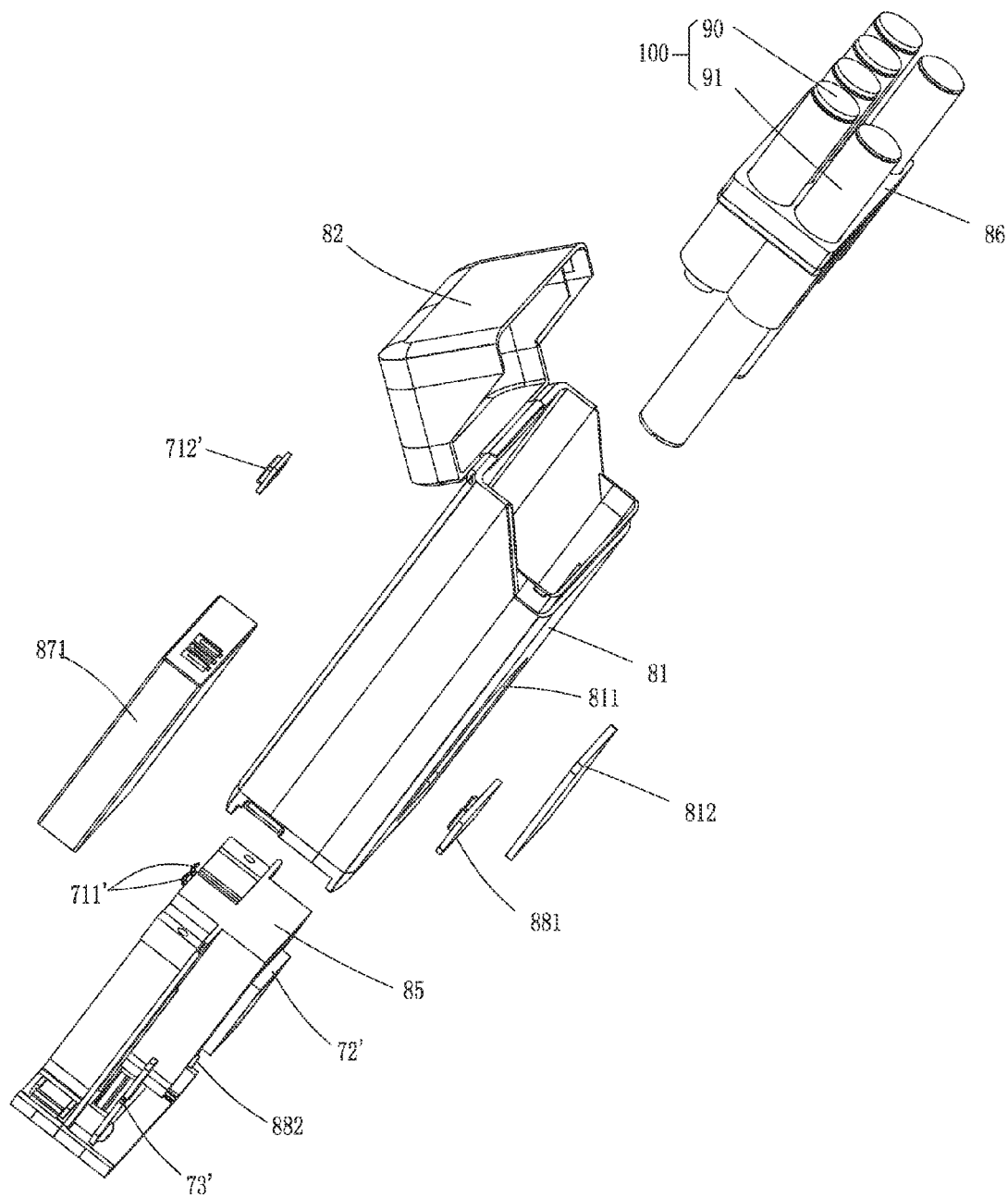
FIG. 4 is an exploded view of the electronic cigarette case in accordance with an embodiment of the present invention.

As shown in FIG. 6, the thermometer device 7' is disposed in the bottom case 81 to detect temperatures of human bodies or outside of the at least one electronic cigarette 100. In this embodiment, the thermometer device 7' is accommodated in the containing trough 851 of the first frame 85. The thermometer device 7' comprises a thermometry unit 71' to detect temperatures of human bodies, objects or surroundings, a display unit 72', and a circuit processing unit electrically connected with the aforesaid two elements. The circuit processing unit receives and processes date of the thermometry unit 71' and controls the display unit 72' displaying data. In this embodiment, the circuit processing unit is integrated on the thermometer circuit board 73' recharged by the rechargeable battery 871 which is disposed in the bottom case 81. The thermometer circuit board 73' is secured on the first frame 85. The display unit 72' is fixed on the thermometer circuit board 73', and a display screen thereof correspondingly faces and fits with the viewing aperture 811 (as shown in FIG. 4). The thermometry unit 71' is disposed on the bottom case 81.

Figure 9:
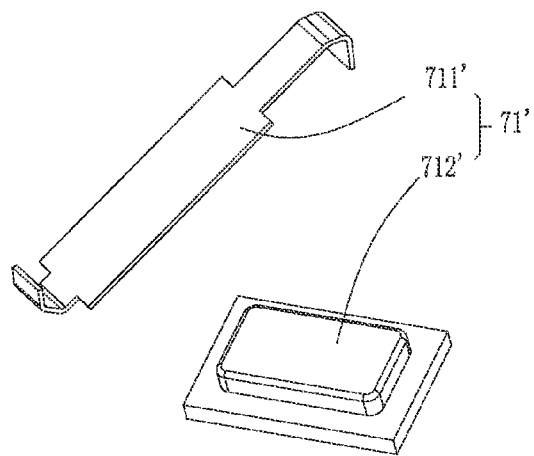
FIG. 9 is an exploded view of a temperature sensor of the electronic cigarette case in accordance with an embodiment of the present invention.
Figure 10:
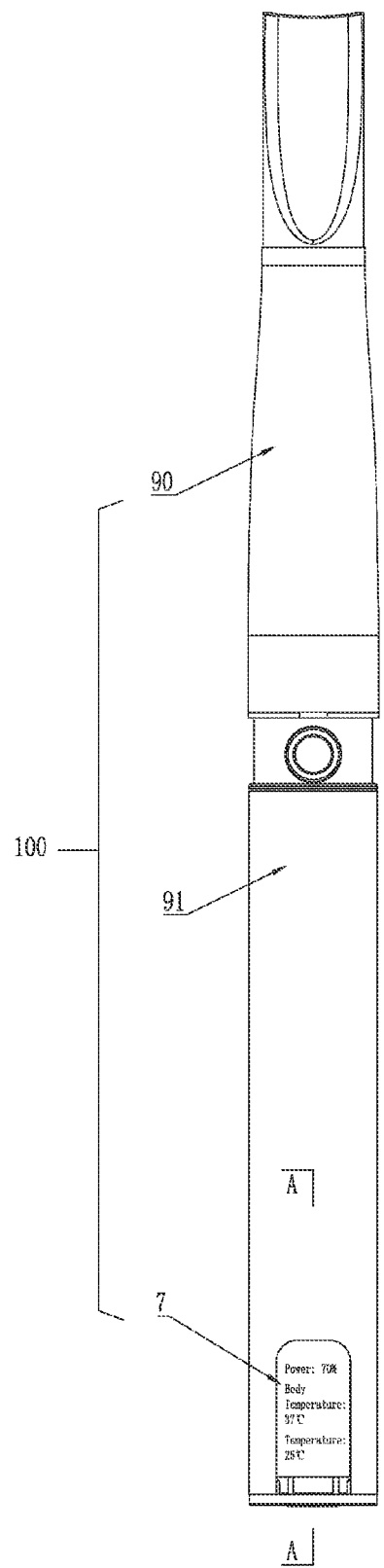
FIG. 10 is an elevational view of an electronic cigarette in accordance with an embodiment of the present invention.

As shown in FIG. 9, the thermometry unit 71' comprises a temperature sensor 712' and an electrode piece 711' used as an electrode. The temperature sensor 712' contacting with articles to be tested or human bodies to detect temperatures.

The electrode piece 711' is used to electrically connect the temperature sensor 712' with the circuit processing unit. The electrode piece 711' is formed by bending a piece of metal. In this embodiment, the electrode piece 711' is substantially s-shape and elastically deformable. Since the circuit processing unit is integrated on the thermometer circuit board 73', the temperature sensor 712' utilizes the electrode piece 711' to electrically connect the thermometer circuit board 73'. The electrode piece 711' crosses through the threading trough 852 of the first frame 85. Two ends of the electrode piece 711' respectively electrically connect with the temperature sensor 712' and the thermometer circuit board 73' (as shown in FIG. 6) and transmit temperature signals detected by the temperature sensor 712' to the circuit processing unit of the thermometer circuit board 73' to control the display unit 72' to display temperature data. The temperature sensor 712' of the thermometry unit 71' matches with the sensor installation hole 814 disposed on the bottom case 81. A sensing end of the temperature sensor 712' extends out of the bottom case 81 through the sensor installation hole 814.

The display unit 72' comprises the display screen to display measured temperatures, quantity of electricity of power, and ambient air temperatures. In this embodiment, the display unit 72' is also integrated on the thermometer circuit board 73' and is disposed under the display window 812. Moreover, a partition plate 75 is inserted between the display unit 72' and the thermometer circuit board 73' for heat resistance and insulation.

In this embodiment, the temperature sensor 712' is a thermistor. When the temperature sensor 712' contacts with the human bodies or other objects, the temperature sensor 712' achieves the contact temperature or external temperature, and correspondingly resistance value get quantitatively changed. The variation is transmitted to the circuit processing unit of the thermometer circuit board 73' to be processed. After receiving and converting the current variation, the circuit processing unit controls the display unit 72' to display measured temperature value. The electronic cigarette case 200 in accordance with the present invention has an additive function of being capable of measuring temperatures of human bodies or other objects precisely. It has advantages of being easy to operate and convenient, and of practical use.

In this embodiment, the thermometry unit 71' is disposed at the bottom case 81. The temperature sensor 712' can be provided at any sidewall of the bottom case 81, such as a front wall, a rear wall, a left wall, or a right wall, or a bottom wall of the bottom case 81. Certainly, the temperature sensor 712' can be alternatively provided on the case cover 82 as long as the shape of the temperature sensor 712' matches with the correspondingly position of casing. Understandably, the display screen of the display unit 72' can be disposed on any proper positions of the bottom case 81 or the case cover 82, and the display window 812 is provided or formed at a correspondingly position of the display screen to display temperature data.

As shown in FIGS. 9-14, each of the at least one electronic cigarette comprises the inhaling rod 90, the power rod 91, and a thermometer device 7. The inhaling rod 90 and the power rod 91 of each of the electronic cigarettes 100 can be connected by engaging fitting, insertion fitting, threaded connection or formed integrally. In this embodiment, the inhaling rod 90 and the power rod 91 are connected by screw threaded connection. The thermometer device 7 is installed in the power rod 91 and certainly also can be alternatively installed in the inhaling rod 90.

Figure 11:
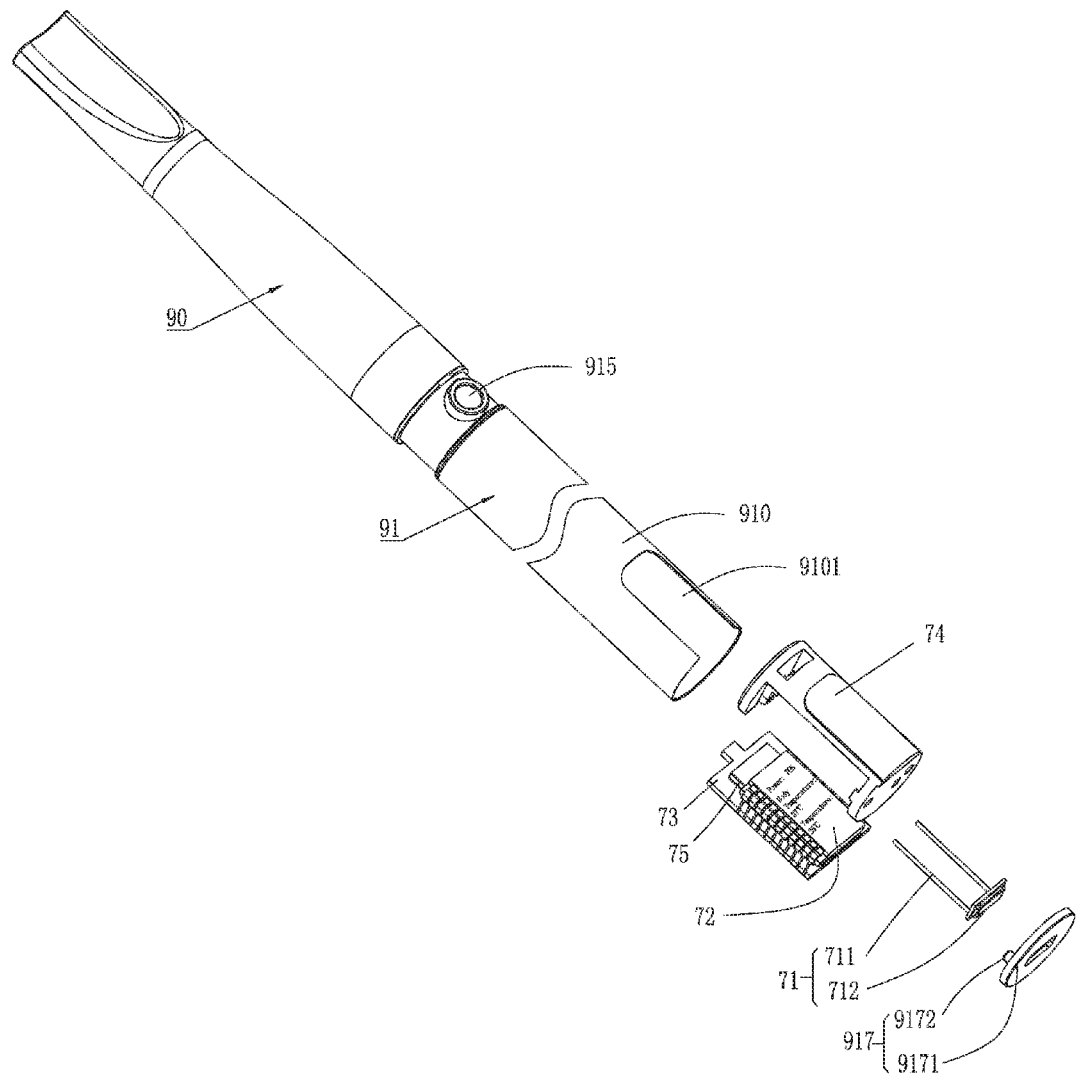
FIG. 11 is an exploded view of the electronic cigarette in accordance with an embodiment of the present invention.

The power rod 91 comprises a sleeve 910, a switch 915, a bottom cover 917 disposed at an end of the sleeve 910. A bottom of the sleeve 910 is provided with a bayonet 9101 (as shown in FIG. 11 to engage with the thermometer device 7. The bottom cover 917 has a through hole 9171 and a plug column 9172. The switch 915 is used to control an atomizer 21 and the thermometer device 7 to work. The thermometer device 7 starts to detect temperatures after the switch 915 is pressed in a long time, while the atomizer 21 starts to work for smoking after the switch 915 is pressed rapidly. Therefore, based on users' needs, users can utilize the switch 915 to control functions of using.

The thermometer device 7 is configured in the power rod 91 to detect temperatures of human bodies or outside of the at least one electronic cigarette 100. In this embodiment, the thermometer device 7 is configured at the bottom of the sleeve 910 by means of mutual engagement of the bottom cover 917 and the bayonet 9101. The thermometer device 7 comprises a thermometry unit 71 to detect temperatures of human bodies, objects or surroundings, a display unit 72, and a circuit processing unit electrically connected with the aforesaid two elements. The circuit processing unit receives and processes data of the thermometry unit 71 to control the display unit 72 displaying data. In this embodiment, the circuit processing unit is integrated on the thermometer circuit board 73 and is recharged by the power in the power rod 91.

Figure 12:
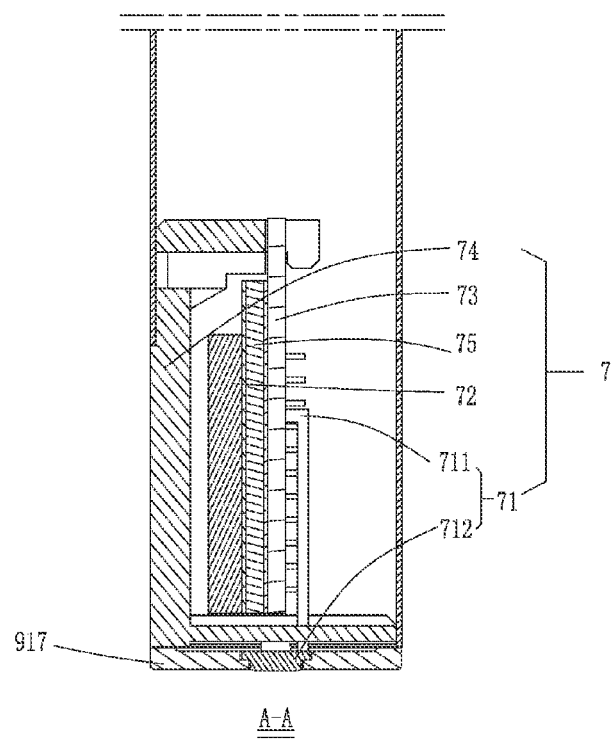
FIG. 12 is a cross-sectional view taken along the line A-A in FIG. 10.
Figure 13:
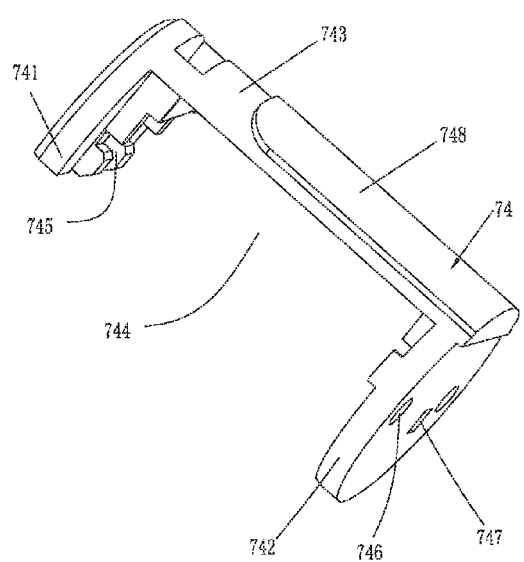
FIG. 13 is a perspective view of a support frame of a thermometer device of the electronic cigarette in accordance with an embodiment of the present invention.
Figure 14:
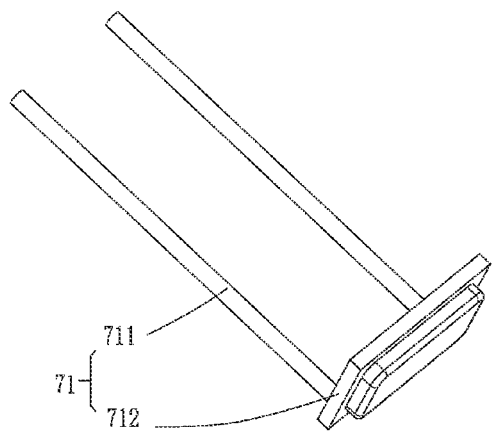
FIG. 14 is a perspective view of a thermometry unit of the thermometer device of the electronic cigarette in accordance with an embodiment of the present invention.

The thermometry unit 71 comprises a temperature sensor 712 and a pin 711 used as an electrode (as shown in FIG. 14). The temperature sensor 712 contacts with articles to be tested and human bodies to detect temperatures. The pin 711 electrically connects the circuit processing unit. In this embodiment, the pin 711 is elongate. The pin 711 electrically connects the thermometer circuit board 73 and the pins 711 after bent is welded to the thermometer circuit board 73 (as shown in FIG. 12) to transmit temperature signals detected by the temperature sensor 712 to the circuit processing unit to control the display unit 72 to display temperature data. In this embodiment, the temperature sensor 712 is a thermistor.

This embodiment further comprises a support frame 74 whose shape is matching with the inner wall of the sleeve 910 and the support frame 74 can be made of transparent plastic material. In this embodiment, the support frame 74 comprises an approximately circular upper board 741, an approximately circular lower board 742, an arc side board 743 connected with the aforesaid two elements, and a containing chamber 744 formed and surrounded by the aforesaid three elements. The containing chamber 744 accommodates the display unit 72 and the thermometer circuit board 73 and a partition plate 75 inserted therebetween for heat resistance and insulation. The support frame 74 further comprises a notch 745 configured on the upper board 741 to fix the thermometer circuit board 73, a pin hole 746 correspondingly matching with the pin 711 provided on the lower board 742, and a plug hole 747 correspondingly insertedly matching with the plug column 9172 of the bottom cover 917. The side board 743 defines a display window 748 corresponding to the display unit 72 and fitted with the bayonet 9101 of the sleeve 910. The display window 748 is an arc convex surface which projects outward from the outer wall of the side board 743 in appropriate thickness. The display window 748 is a transparent material; therefore, data displayed on the display unit 72 can be seen through the display window 748.

The display unit 72 comprises the display screen configured under the display window 748 to display measured temperatures and also to display quantity of electricity of power and ambient air temperatures. In this embodiment, the pin 711 of the thermometry unit 71 matches with the pin hole 746 and the temperature sensor 712 matches with the through hole 9171 of the bottom cover 917. The pin 711 passes through the pin hole 746 and welds to the thermometer circuit board 73 after being bent. An sensing end of the temperature sensor 712 extends out of the bottom cover 917 through the through hole 9171. In this embodiment, the thermometry unit 71 is installed in the power rod 91 and certainly also can be alternatively configured on the inhaling nozzle 4. Therefore, when the inhaling nozzle 4 is put in a mouth or contacting with human body, the thermometry unit 71 is able to detect temperatures.

Since the thermometer device 7 and the thermometer device 7' have the same function and principle, the detail description of the function and principle of the thermometer device 7 is no longer described in detail here. The at least one electronic cigarette 100 in accordance with the present invention has an additive function of being capable of detecting temperatures of human bodies or other objects precisely. It has advantages of being easy to operate and convenient, and of practical use.

Understandably, the circuit processing unit also can be integrated on an atomizer control circuit board (not shown) of the at least one electronic cigarette 100. The thermometer device 7 can be disposed at any appropriate place of outside casing of the at least one electronic cigarette, comprising the inhaling nozzle 4, an inhaling sleeve, the sleeve 910, or the bottom cover 917, as long as the shape of the temperature sensor 712 is fitted to the corresponding place of the casing. Similarly, the display unit 72 also can be configured in any appropriate place of the casing of the at least one electronic cigarette, and the display window is formed or configured on the corresponding place to display temperature data.

The above mentioned is only exemplary embodiments of the present invention. It should be noted, for persons of ordinary skill in this art field, improvements and modifications within the spirit of the present invention can be further made, and such improvements and modifications should be seemed to be included in the claimed scope of the present invention.

What is claimed is:

1. An electronic cigarette case, comprising a case body for accommodating at least one electronic cigarette, wherein the case body further comprises a thermometer device disposed therein, the thermometer device comprising a thermometry unit, a display unit and a circuit processing unit, the thermometry unit detecting temperatures of articles to be sensed and transmitting temperature data to the circuit processing unit for controlling the display unit to display measured temperatures;

the thermometry unit comprises a temperature sensor and an electrode piece, the temperature sensor disposed at an outside of the case body and electrically connected with the circuit processing unit via the electrode piece, the display unit provided within the case body, and the case body having a display window corresponding to the display unit;

the case body comprises a bottom case, a case cover, and a charging device which is used to recharge the at least one electronic cigarette;

the thermometer device further comprises a thermometer circuit board, the circuit processing unit integrated on the thermometer circuit board, and the display unit configured on the thermometer circuit board;

the charging device comprises a rechargeable battery, a charging base, and a charging circuit processing unit electrically connected with the rechargeable battery and the charging base for controlling the charging battery to recharge and discharge;

the charging circuit processing unit is integrated on the thermometer circuit board.

2. The electronic cigarette case as claimed in claim 1, wherein the thermometer circuit board and the display unit overlapped together; the bottom case comprises and disposes therein a first frame to accommodate the rechargeable battery, and a second frame to hold and support the at least one electronic cigarette; the thermometer device is disposed in the electronic cigarette case via the first frame; the first frame defines a threading trough; the electrode piece crosses through the threading trough of the first frame; two ends of the electrode piece respectively electrically connect with the temperature sensor and the thermometer circuit board, and transmit temperature signals detected by the temperature sensor to the circuit processing unit of the thermometer circuit board to control the display unit to display temperature data.

3. The electronic cigarette case as claimed in claim 1, wherein the charging base comprises a first electrode piece and a second electrode piece respectively electrically connecting with a first electrode and a second electrode of the at least one electronic cigarette, and the first electrode piece and the second electrode piece respectively connect a first electrode and a second electrode of the rechargeable battery.

4. The electronic cigarette case as claimed in claim 1, wherein the charging device further comprises an Universal Serial Bus (USB) interface for insertedly connecting with an external power, the USB interface electrically connected with the charging circuit processing unit, and the USB interface also integrated on the thermometer circuit board.

5. An electronic cigarette device comprises the electronic cigarette case and an inhaling rod and a power rod of the at least one electronic cigarette accommodated in the electronic cigarette case as claimed in claim 1.

6. An electronic cigarette case, comprising a case body for accommodating at least one electronic cigarette, wherein the case body further comprises a thermometer device disposed therein, the thermometer device comprising a thermometry unit, a display unit and a circuit processing unit, the thermometry unit detecting temperatures of articles to be sensed and transmitting temperature data to the circuit processing unit for controlling the display unit to display measured temperatures;

the thermometry unit comprises a temperature sensor and an electrode piece, the temperature sensor disposed at an outside of the case body and electrically connected with the circuit processing unit via the electrode piece, the display unit provided within the case body, and the case body having a display window corresponding to the display unit;

a sensor hole is formed on the case body, the temperature sensor installed in the sensor hole and a side of the temperature sensor exposed outside the case body, the electrode piece being s-shaped of which one end engages with a side of the temperature sensor, the other end of the electrode piece engaged with the thermometer circuit board to enable the temperature sensor electrically connected with the thermometer circuit board.

7. An electronic cigarette case, comprising a case body for accommodating at least one electronic cigarette, wherein the case body further comprises a thermometer device disposed therein, the thermometer device comprising a thermometry unit, a display unit and a circuit processing unit, the thermometry unit detecting temperatures of articles to be sensed and transmitting temperature data to the circuit processing unit for controlling the display unit to display measured temperatures;

the thermometry unit comprises a temperature sensor and an electrode piece, the temperature sensor disposed at an outside of the case body and electrically connected with the circuit processing unit via the electrode piece, the display unit provided within the case body, and the case body having a display window corresponding to the display unit;

the case body comprises a bottom case, a case cover, and a charging device which is used to recharge the at least one electronic cigarette;

the thermometer device further comprises a thermometer circuit board, the circuit processing unit integrated on the thermometer circuit board, and the display unit configured on the thermometer circuit board;

the electronic cigarette case further comprising a switch device, wherein the switch device comprises a key disposed at the case body, and a control button correspondingly disposed on the thermometer circuit board; the control button and the thermometer circuit board are electrically connected by pressing the key so as to control the at least one electronic cigarette to recharge and/or to control the thermometer device to detect temperatures.

8. The electronic cigarette case as claimed in claim 7, wherein, by pressing the key in different time periods, the at least one electronic cigarette is capable of being triggered to recharge and the thermometer device is capable of being triggered to detect temperatures.

* * * * *